US012717267B2

(12) United States Patent
Oishi

(10) Patent No.: US 12,717,267 B2
(45) Date of Patent: Aug. 25, 2026

(54) PRINTING SYSTEM THAT INCLUDES A STATIC ELIMINATION DEVICE, CONTROL METHOD FOR PRINTING SYSTEM, AND STORAGE MEDIUM

(71) Applicant: CANON KABUSHIKI KAISHA, Tokyo (JP)

(72) Inventor: Shoko Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/920,113

(22) Filed: Oct. 18, 2024

(65) Prior Publication Data

US 2025/0130523 A1 Apr. 24, 2025

(30) Foreign Application Priority Data

Oct. 20, 2023 (JP) ................................ 2023-180715

(51) Int. Cl.
*G03G 21/00* (2006.01)
*G03G 15/00* (2006.01)
*G03G 21/06* (2006.01)

(52) U.S. Cl.
CPC ......... *G03G 21/06* (2013.01); *G03G 15/5016* (2013.01); *G03G 15/657* (2013.01); *G03G 2215/00556* (2013.01)

(58) Field of Classification Search
CPC ............. G03G 15/5016; G03G 15/657; G03G 15/6573; G03G 21/06; G03G 2215/00535; G03G 2215/00556
See application file for complete search history.

(56) References Cited

U.S. PATENT DOCUMENTS 11,520,259 B2 * 12/2022 Iwasawa ............ G03G 15/6573
12,353,155 B2 * 7/2025 Iwami ................ G03G 15/6573
2025/0237980 A1 * 7/2025 Kanematsu ........ G03G 15/6573

FOREIGN PATENT DOCUMENTS

JP 2016112748 A 6/2016

* cited by examiner

*Primary Examiner* — Hoang X Ngo

(74) *Attorney, Agent, or Firm* — Canon U.S.A., Inc. IP Division

(57) ABSTRACT

A printing system includes a printing device configured to print an image on a first side of a sheet conveyed, a static elimination device configured to perform a static elimination process on the first side of the sheet on which the image has been printed, a reversal path configured to reverse the sheet on which the static elimination process has been performed, and a control unit configured to, in a case where a face-up ejection of the sheet to eject with the first side facing upward is specified, perform control to not reverse the sheet on which the static elimination process has been performed, in a case where a face-down ejection of the sheet to eject with the first side facing downward is specified, control the reversal path to reverse the sheet on which the static elimination process has been performed, and perform control to eject the sheet.

9 Claims, 19 Drawing Sheets

FIG. 9A-A
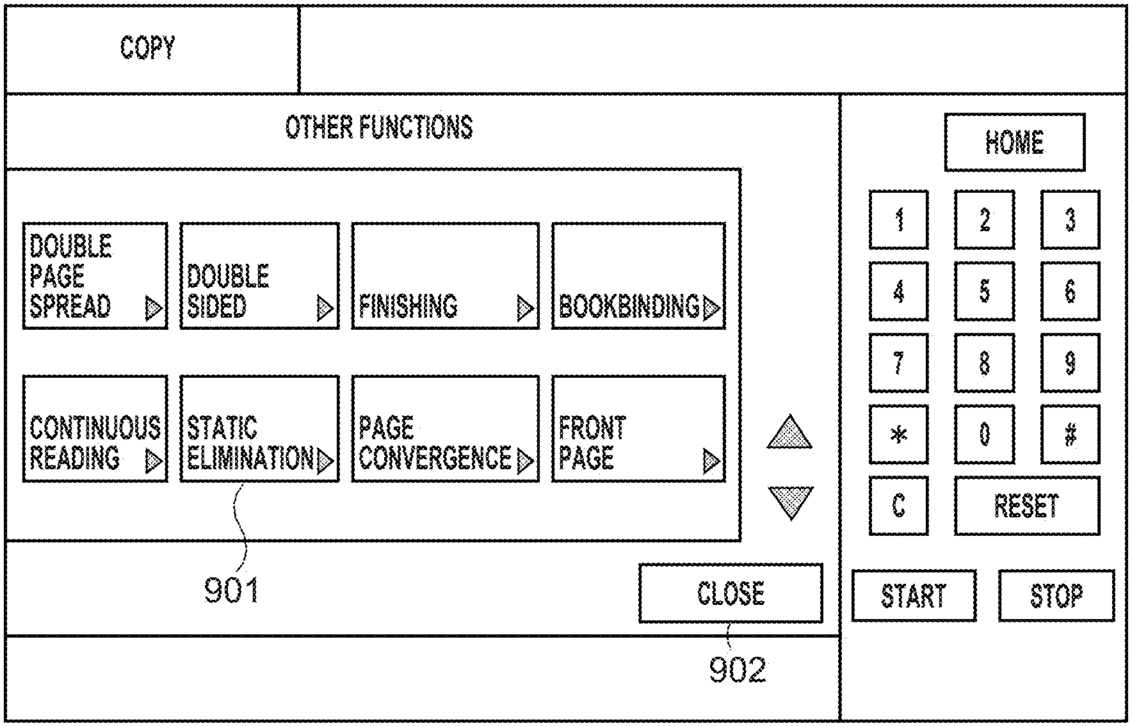
FIG. 9A-B
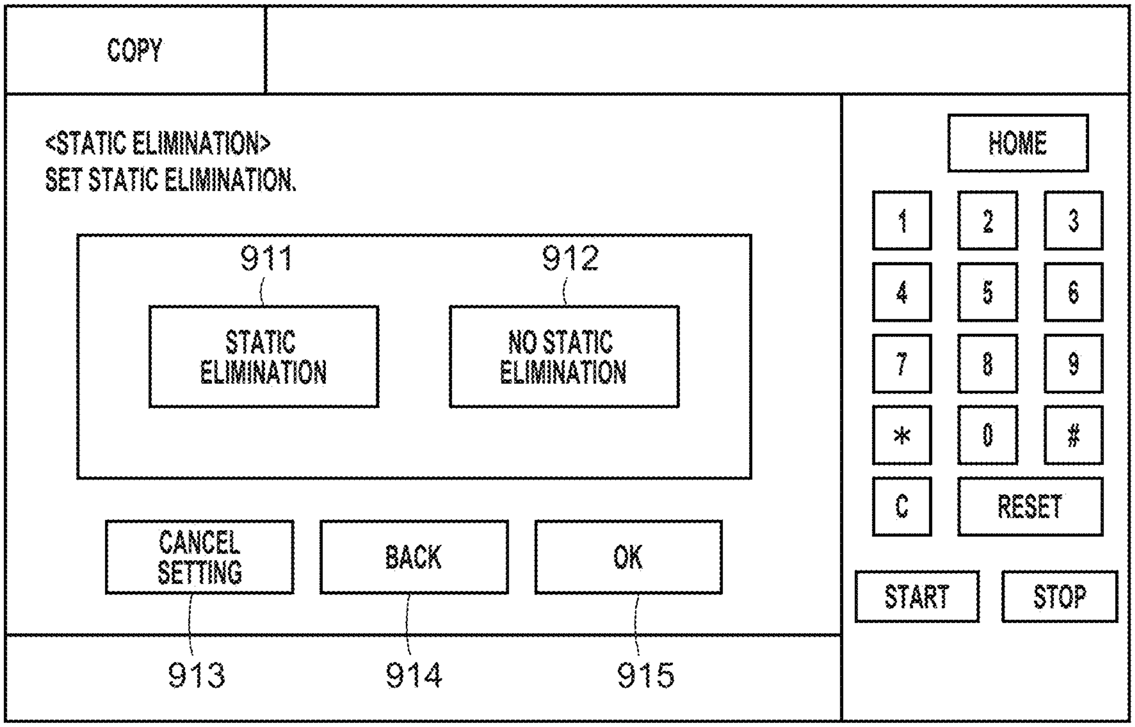

PRINTING SYSTEM THAT INCLUDES A STATIC ELIMINATION DEVICE, CONTROL METHOD FOR PRINTING SYSTEM, AND STORAGE MEDIUM

BACKGROUND

Field of the Disclosure

The present disclosure relates to a printing system, a control method for a printing system, and a storage medium.

Description of the Related Art

When an image is formed in a printing device, the print sheet becomes charged with static electricity. There are static elimination devices that perform a static elimination process to eliminate static electricity from print sheets. The static elimination device applies a voltage to a conveyance roller (hereinafter, referred to as "static elimination roller") to apply a charge opposite to the charge on the print sheet to the print sheet to neutralize the static electricity. The charge applied to the static elimination roller is positive. Thus, in order to neutralize the static electricity, the static elimination roller is brought into contact with the negatively charged printed side of the print sheet. To bring the static elimination roller into contact with the print sheet from above, the print sheet needs to be conveyed with the printed side facing upward to the static elimination device.

A printing system including a static elimination device as described above controls the conveyance of print sheets so that their printed sides facing upward are conveyed into the static elimination device for the static elimination device to perform a static elimination process. In addition, a printing system provided with a post-processing device downstream of the static elimination device designates the orientation of the print sheet to be processed by the post-processing device.

The system discussed in Japanese Patent Application Laid-Open No. 2016-112748 controls the printing process and the reverse process on a print sheet to be creased by a creasing device and subject to a process performed by a post-processing device based on whether the print sheet faces upward or downward. However, according to Japanese Patent Application Laid-Open No. 2016-112748, to convey print sheets facing downward into the post-processing device with no creasing device configured, the print sheets are reversed in the main body, which disallows the print sheets facing upward to be conveyed into the static elimination device.

In other words, a static elimination device cannot perform a static elimination process on print sheets when the print sheets that face downward are discharged to a device downstream of the static elimination device.

SUMMARY

Some embodiments of the present disclosure include the following configuration in order to solve the above issue.

According to an aspect of the present disclosure, a printing system includes a printing device configured to print an image on a first side of a sheet conveyed, a static elimination device configured to perform a static elimination process on the first side of the sheet on which the image has been printed by the printing device, a reversal path configured to reverse the sheet on which the static elimination process has been performed by the static elimination device, and a control unit configured to, in a case where a face-up ejection of the sheet to eject with the first side facing upward is specified, perform control to not reverse the sheet on which the static elimination process has been performed by the static elimination device, in a case where a face-down ejection of the sheet to eject with the first side facing downward is specified, perform control to reverse, with the reversal path, the sheet on which the static elimination process has been performed by the static elimination device, and perform control to eject the sheet reversed by the reversal path.

Further features of various embodiments will become apparent from the following description of exemplary embodiments with reference to the attached drawings.

BRIEF DESCRIPTION OF THE DRAWINGS

FIGS. 9A-A and 9A-B are examples of setting screens for setting a static elimination device.

FIG. 9B is an example of a setting screen for setting the static elimination device.

DESCRIPTION OF THE EMBODIMENTS

Hereinafter, exemplary embodiments will be described with reference to the accompanying drawings. The following exemplary embodiments do not limit every embodiment in the scope of the claims.

Overall Configuration of Printing System (Overall Configuration)

Figure 1:
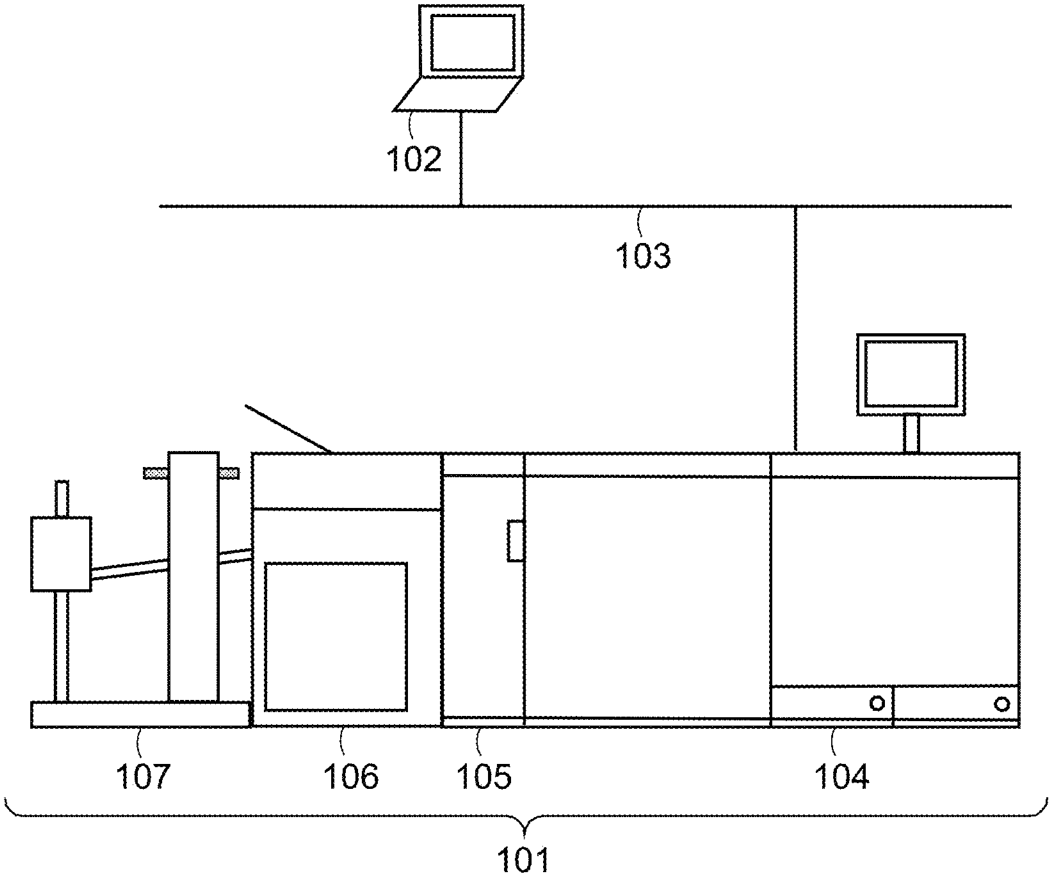
FIG. 1 is a diagram illustrating the overall hardware configuration of a printing system.

FIG. 1 is an overall view of a hardware configuration of a printing system according to a first exemplary embodiment. The printing system includes an image forming apparatus 101 and a personal computer (PC) 102. A plurality of devices having different functions is connected to the image forming apparatus 101. In the present exemplary embodiment, the image forming apparatus 101 includes a printing device 104, a static elimination device 105, a large-capacity stacker 106, and a multipurpose stacker 107.

The PC 102 can communicate with the image forming apparatus 101 via a network 103, such as a local area network (LAN).

The PC 102 transmits jobs for executing print and copy functions to the printing device 104 using a printer driver or the like. The network 103 may be a wired network or a wireless network. On a wireless network, the PC 102 may take the form of a portable terminal.

Next, each device included in the image forming apparatus 101 will be described.

(Printing Device)

The printing device 104 forms an image using toner on a paper sheet (sheet) conveyed from a paper feed unit located at a lower part of the printing device 104. The configuration and operating principle of the printing device 104 are as follows. Light rays, such as laser light, modulated in accordance with image data are reflected by a rotating multifaceted mirror, such as a polygon mirror, and are projected as scanning rays onto a photoconductive drum. A static latent image is formed on the photoconductive drum by the laser light and is developed with toner, and the toner image is transferred to a paper sheet attached to a transfer drum. This series of steps of image formation process are sequentially executed with yellow (Y), magenta (M), cyan (C), and black (K) toners to form a full-color image on the paper sheet. The paper sheet with the full-color image on the transfer drum is conveyed to a fixing unit. The fixing unit includes a roller, a belt, and the like, and includes a heat source, such as a halogen heater, built in the roller. The fixing unit melts the toner that is the transferred toner image on the paper sheet by heat and pressure to fix the toner to the paper sheet.

(Static Elimination Device)

The static elimination device 105 is a device that has a function of eliminating static electricity on paper sheets.

(Large-Capacity Stacker)

The large-capacity stacker 106, which is an example of a finisher (sheet processing device), is a stacker capable of stacking a large amount of paper sheets.

(Multipurpose Stacker)

The multipurpose stacker 107, which is an example of a finisher (sheet processing device), is a stacker capable of stacking wide paper sheets. The multipurpose stacker 107 can be easily disconnected from an image processing apparatus and can be easily carried with paper sheets stacked therein.

The multipurpose stacker 107 further has a function of electrically raising and lowering a paper ejection table.

In the image processing system described in FIG. 1, the PC 102 alone is connected to the image forming apparatus 101. However, some embodiments are not limited to the configuration in which the PC 102 alone is connected to the image forming apparatus 101. That is, the image forming apparatus 101 and an external controller may be communicably connected via an internal LAN and a video cable, and the external controller may be communicably connected to the PC 102 via an external LAN.

In this case, print instructions are issued from the PC 102 to the external controller.

System Configuration of Printing System

Figure 2:
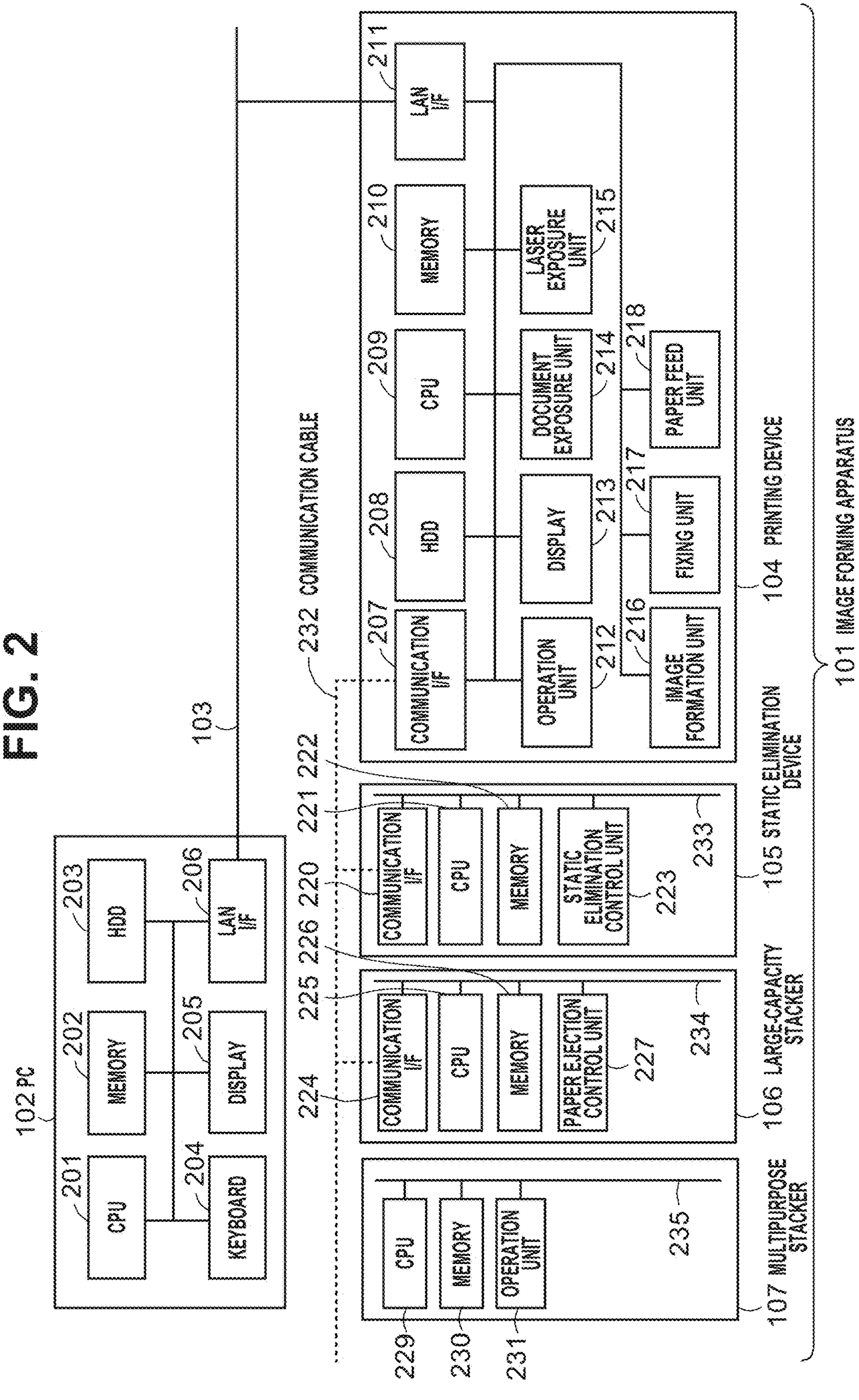
FIG. 2 is a block diagram illustrating a system configuration of the printing system.

FIG. 2 is a block diagram illustrating a system configuration of the image forming apparatus 101 and the PC 102.

(Printing Device)

First, a configuration of the printing device 104 in the image forming apparatus 101 will be described. The printing device 104 includes a communication interface (I/F) 207, a hard disk device (HDD) 208, a central processing unit (CPU) 209, a memory 210, a LAN I/F 211, an operation unit 212, and a display 213. The printing device 104 further includes a document exposure unit 214, a laser exposure unit 215, an image formation unit 216, a fixing unit 217, and a paper feed unit 218. These components are connected via a system bus 219 to each other.

The communication I/F 207 is connected to the static elimination device 105 and the large-capacity stacker 106 via a communication cable 232, and performs communications for controlling each device. The multipurpose stacker 107 does not include a communication I/F, and thus does not perform communications for controlling the printing device 104 and the like.

The HDD 208 is a storage device that stores programs and data.

The CPU 209 comprehensively controls image processing and printing based on programs and the like saved in the HDD 208.

The memory 210 stores programs for the CPU 209 to perform various processes, and image data, and operates as a work area.

The LAN I/F 211 is connected to the external LAN 103 and communicates with the PC 102 and the like.

The operation unit 212 receives various setting inputs and operation instructions from the user.

The display 213 displays setting information about the image processing apparatus, processing statuses of print jobs, and the like.

The document exposure unit 214 performs a process of reading a document in using the copy function or the scan function. The document data is read by the paper sheet placed by the user being illuminated with an exposure lamp and an image being captured with a charged coupled device (CCD) camera.

The laser exposure unit 215 is a device that performs primary charging and laser exposure to irradiate the photoconductive drum with laser light in order to transfer a toner image. In the laser exposure unit 215, first, the primary charging is performed to charge the surface of the photoconductive drum to a uniform negative potential. Next, the photoconductive drum is irradiated with laser light by a laser driver while the reflection angle is adjusted with a polygon mirror. This neutralizes the negative charge in the irradiated portions, forming an electrostatic latent image.

The image formation unit 216 is a device for transferring toner onto a paper sheet. The image formation unit 216 includes a development unit, a transfer unit, and a toner supply unit, and transfers the toner on the photoconductive drum onto a paper sheet. In the development unit, negatively charged toner from a development cylinder is adhered to the electrostatic latent image on the surface of the photoconductive drum to create a visible image. In the transfer unit, a primary transfer is performed to apply a positive potential to a primary transfer roller to transfer the toner from the surface of the photoconductive drum onto a transfer belt. A secondary transfer is then performed to apply a positive potential to a secondary outer transfer roller to transfer the toner from the transfer belt onto the paper sheet.

The fixing unit 217 is a device for melting and fixing the toner on the paper sheet to the paper sheet by heat and pressure, and includes a heater, a fixing belt, and a pressure belt.

The paper feed unit 218 is a device for feeding paper sheets, and controls paper feeding and conveyance operation by rollers and various sensors.

(Static Elimination Device)

Next, a configuration of the static elimination device 105 will be described. The static elimination device 105 includes a communication I/F 220, a CPU 221, a memory 222, and a static elimination control unit 223, and these components are connected via a system bus 233. The communication I/F 220 is connected to the printing device 104 via the communication cable 232 to perform communications for control.

The CPU 221 performs various controls for static elimination in accordance with control programs stored in the memory 222 and instructions from a print control unit 305 (described below) of the printing device 104.

The memory 222 is a storage device that stores the control programs.

The static elimination control unit 223 controls a charge application controller in response to instructions from the CPU 221.

(Large-Capacity Stacker)

Next, a configuration of the large-capacity stacker 106, which is a finisher, will be described. The large-capacity stacker 106 includes a communication I/F 224, a CPU 225, a memory 226, and a paper ejection control unit 227. These components are connected via a system bus 234.

The communication I/F 224 is connected to the printing device 104 via the communication cable 232 to perform communications for control.

The CPU 225 performs various controls for paper ejection in accordance with control programs stored in the memory 226 and instructions from the print control unit 305 of the printing device 104 described below.

The memory 226 is a storage device that stores control programs.

Based on instructions from the CPU 225, the paper ejection control unit 227 controls the conveyance of paper sheets to a stack tray, an escape tray, and the subsequent multipurpose stacker 107.

(Multipurpose Stacker)

Next, a configuration of the multipurpose stacker 107 as a finisher will be described. The multipurpose stacker 107 includes a CPU 229, a memory 230, and an operation unit 231, and these components are connected via a system bus 235.

The CPU 229 performs various controls for lifting and lowering the paper ejection tray in accordance with inputs from the operation unit 231 and control programs stored in the memory 230.

The memory 230 is a storage device that stores the control program.

The operation unit 231 receives various setting inputs and operation instructions from the user.

(PC)

Next, a configuration of the PC 102 will be described. The PC 102 includes a CPU 201, a memory 202, an HDD 203, a keyboard 204, a display 205, and a LAN I/F 206, which are connected via a system bus.

The CPU 201 creates print data and issues print instructions based on document processing programs or the like stored in the HDD 203. The CPU 201 also comprehensively controls each device connected to the system bus.

The memory 202 stores programs and data for the CPU 201 to perform various processes, and operates as a work area.

The HDD 203 stores programs and data for operations, such as printing.

The keyboard 204 is a device for inputting operation instructions for the PC 102.

On the display 205, information on applications executed by the PC 102 and the like are displayed with still images and video signals of moving images.

The LAN I/F 206 is connected to the external LAN 104 to perform communications of printing instructions or the like.

In the above description, it is sufficient that the memory 202, the memory 210, the memory 222, the memory 226, and the memory 230 are each a storage device for holding data and programs. The memory 202, the memory 210, the memory 222, the memory 226, and the memory 230 may be replaced with a volatile RAM, a non-volatile ROM, an internal HDD, an external HDD, or a USB memory.

CPU Configuration of Printing Device

Figure 3:
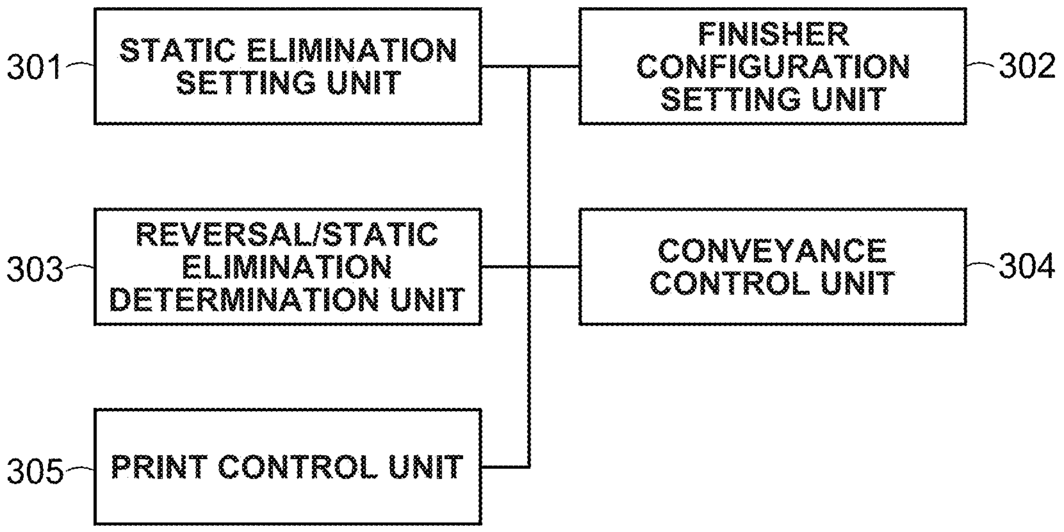
FIG. 3 is a block diagram illustrating the configuration of a control system of an image forming apparatus.

FIG. 3 is a block diagram illustrating a configuration of the CPU 209 of the printing device 104. A static elimination setting unit 301 sets whether to perform a static elimination process by the static elimination device 105 and sets the intensity of the static elimination control.

The static elimination setting unit 301 makes settings based on the input(s) accepted on setting screens illustrated in FIGS. 9A-A, 9A-B, and 9B described below (hereinafter, FIGS. 9A and 9B will be collectively referred to as "FIG. 9"). A finisher configuration setting unit 302 sets the face orientation of a paper sheet when a finisher, such as the multipurpose stacker 107, receives the paper sheet. The finisher configuration setting unit 302 makes settings based on the input(s) received on a setting screen illustrated in FIG. 10 described below.

A reversal/static elimination determination unit 303 determines whether to reverse a paper sheet in the printing device 104 and the large-capacity stacker 106, and whether to perform a static elimination process by the static elimination device 105. The reversal/static elimination determination unit 303 makes the determination, based on the input(s) received on the setting screens illustrated in FIGS. 7 and 8 described below, the settings made by the static elimination setting unit 301, and the settings acquired by the finisher configuration setting unit 302.

A conveyance control unit 304 controls the conveyance path of a paper sheet in the printing device 104 in accordance with the determination by the reversal/static elimination determination unit 303.

Based on the result of determination by the reversal/static elimination determination unit 303, the print control unit 305 controls the reversal and static elimination process in the paper sheet reversal path of a subsequent device, and the printing process.

Structure of Image Forming Apparatus

Figure 4:
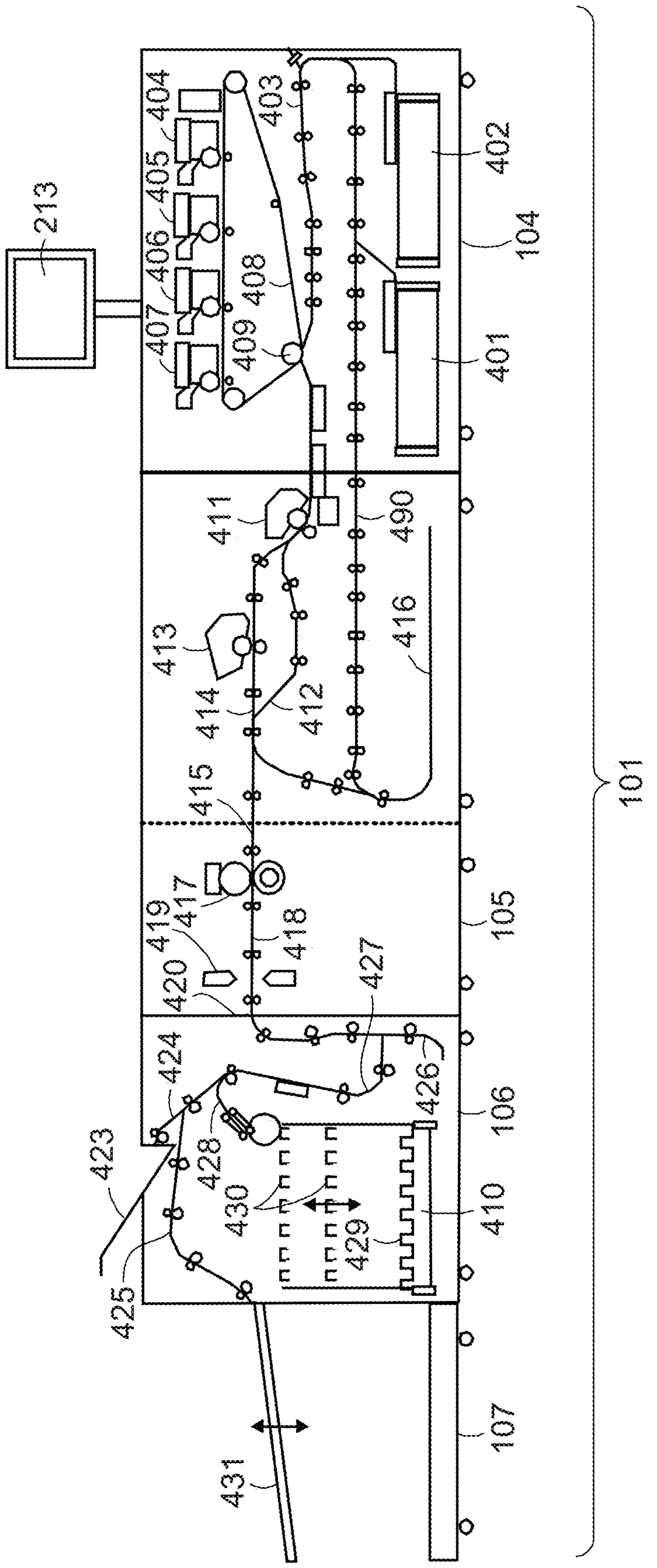
FIG. 4 is a schematic cross-sectional view of a structure of the image forming apparatus.

FIG. 4 is a cross-sectional view of a structure of the image forming apparatus 101.

The printing device 104 forms an image to be printed on a paper sheet.

Various types of paper sheets can be stored in paper feed decks 401 and 402. Each of the paper sheet feed decks 401 and 402 can separate only the topmost paper sheet stored therein and convey the paper sheet to a paper sheet conveyance path 403. Development stations 404 to 407 form toner images using color toners Y, M, C, and K, respectively, to form a color image. The toner images formed here are primarily transferred to an intermediate transfer belt 408, which rotates clockwise in the drawing, so that the toner images are transferred to the paper sheet conveyed from the paper sheet conveyance path 403 at a secondary transfer position 409.

The display 213 displays information on the printing status and settings of the image forming apparatus 101.

The fixing unit 411 is a fixing unit for fixing the toner images to the paper sheet, and includes a pressure roller and a heating roller. As the paper sheet passes between these rollers, the toner is melted and pressed, fixing the toner images to the paper sheet. The paper sheet through the fixing unit 411 is conveyed to a paper sheet conveyance path 415 through the paper sheet conveyance path 412.

If the paper sheet is to be additionally subjected to the melting and pressing process for fixing depending on the type of paper sheet, the paper sheet after passing through the fixing unit 411 is conveyed to the second fixing unit 413 using the upper paper sheet conveyance path, where the paper sheet is subjected to an additional melting and pressing process, and then is conveyed to the paper sheet conveyance path 415 through the paper sheet conveyance path 414.

If the setting of ejecting the paper sheet facing downward is specified, the paper sheet is conveyed to a paper sheet reversal path 416 and, reversed in the paper sheet reversal path 416, the paper sheet facing downward is conveyed to the paper sheet conveyance path 415.

In double-sided printing, the paper sheet is conveyed to the paper sheet reversal path 416, reversed in the paper sheet reversal path 416, and then conveyed to a double-sided conveyance path 490, where an image is then transferred on the second side at the secondary transfer position 409. For higher printing productivity in double-sided printing, the paper sheet with the image formed on the second side is not reversed in the paper sheet reversal path 416.

(Static Elimination Device)

The static elimination device 105 has a function of eliminating a static electricity charged on a paper sheet. The static elimination device 105 includes a static elimination roller 417 that, when in contact with a paper sheet, eliminates a static electricity, an ionizer 419 that, without contact with a paper sheet, eliminates a static electricity, and a voltage application controller that applies voltages to the static elimination roller 417 and the ionizer 419. A paper sheet through the printing device 104 is conveyed while being sandwiched between the static elimination roller 417 and its paired roller, when its static electricity is roughly eliminated by the static elimination roller 417. While being conveyed on the paper sheet conveyance path 418, the paper sheet has the remaining charge adjusted by the ionizer 419, and is then conveyed to a paper sheet conveyance path 420. The static elimination process will be described in detail with reference to FIG. 5.

(Large-Capacity Stacker)

The large-capacity stacker 106 is a stacker capable of stacking a large number of paper sheets. The large-capacity stacker 106 includes a stack tray 429 as a tray for stacking paper sheets. Paper sheets through the static elimination device 105 are input to the large-capacity stacker 106 through a paper sheet conveyance path 427. The paper sheets pass from the paper sheet conveyance path 427 through a paper sheet conveyance path 428 and are stacked on the stack tray 429 while being flipped. The stack tray 429 includes lift trays 430 and an eject tray 410. The large-capacity stacker 106 further includes an escape tray 423 as a paper sheet ejection tray.

In ejecting a paper sheet to the escape tray 423, the paper sheet is conveyed from the paper sheet conveyance path 427 through the paper sheet conveyance path 424 to the escape tray 423. In conveying a paper sheet to a device downstream of the large-capacity stacker 106, the paper sheet is conveyed through a paper sheet conveyance path 425. A paper sheet reversal path 426 is used for reversing a paper sheet based on the result of determination by the reversal/static elimination determination unit 303 described below.

In the present exemplary embodiment, the paper sheet reversal path 426 is provided in the large-capacity stacker 106. A device dedicated to paper sheet reversal may be provided downstream of the static elimination device 105.

(Multipurpose Stacker)

The multipurpose stacker 107 is a stacker capable of stacking wide paper sheets. The multipurpose stacker 107 includes a stacking table 431 as a table for stacking paper sheets. Paper sheets through the large-capacity stacker 106 are ejected to the stacking table 431. The multipurpose stacker 107 receives and stacks paper sheets facing downing.

Description of Static Elimination Process

Figure 5:
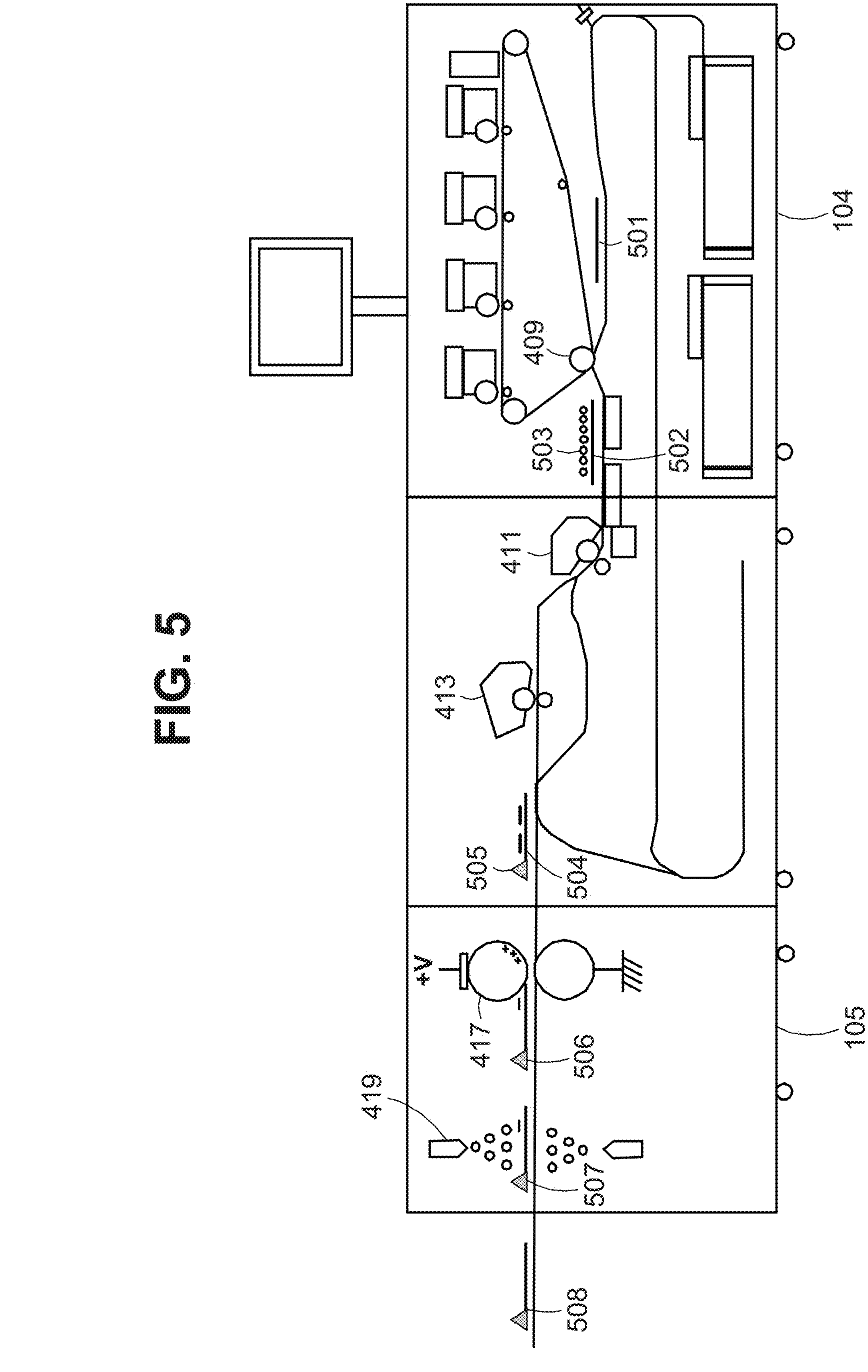
FIG. 5 is a schematic diagram illustrating how the image forming apparatus performs a static elimination process.

FIG. 5 is a schematic diagram illustrating how the static elimination device 105 performs a static elimination process on a paper sheet subjected to the printing process by the printing device 104.

A paper sheet 501 is conveyed to the secondary transfer position 409, where toner is placed on the paper sheet 501. The toner 503 is negatively charged, and the paper sheet 502 on which the toner is placed passes through the fixing unit 411 and the second fixing unit 413 so that the toner is fixed. The toner-fixed paper sheet 501 is conveyed to the static elimination device 105 with a printed side 505 negatively charged. The static elimination roller 417 of the static elimination device 105 is positively charged, and the static elimination roller 417 contacts the printed side 505 of the negatively charged paper sheet 504 to apply a positive charge, clearing the charged state. At this time, it is considered that the negative charge not eliminated through the static elimination process by the static elimination roller 417, or opposite positive charge, remains on the paper sheet 506 after passing through the static elimination roller 417. The paper sheet 506 through the static elimination roller 417 is conveyed to the ionizer 419. The ionizer 419 is a device that applies a voltage to an electrode needle included in the ionizer 419 to generate a corona discharge, and uses the ions generated by the corona discharge to clear the charged state. A paper sheet 507 conveyed to the ionizer 419 has the charge eliminated by the ions. In this way, the static elimination roller 417 performs a rough static elimination, and the ionizer 419 adjusts the remaining charge, so that a paper sheet 508 ejected from the static elimination device 105 after the static elimination process is in a static-free state.

In double-sided printing, the paper sheet 508 is in a static-free state when the static elimination process is performed on the second side as the final printed side.

As described above, in order for the static elimination device 105 to eliminate the static charge on a paper sheet, the paper sheet is conveyed to the static elimination device 105 with its printed side facing upward. If the paper sheet is conveyed to the static elimination device 105 with its printed side facing downward, the static elimination roller 417 will apply a positive charge to the positively charged side of the paper sheet, or its unprinted side, deteriorating the charged state of the paper sheet.

As an example, the charged state of the paper sheet becomes deteriorated under the specified setting of a single-sided printing with face-down paper sheet ejection. With a single-sided printing with face-down paper sheet ejection specified, the paper sheet is reversed in the paper sheet reversal path 416 of the printing device 104. The paper sheet facing downward is then conveyed to the static elimination device 105, where the charge applied by the static elimination roller 417 deteriorates the charged state.

Display Screen

Next, screens for making various settings will be described. FIGS. 6 to 10 illustrate examples of display screens on the display 213 of the printing device 104, which are displayed in response to instructions from the CPU 209 of the printing device 104.

(Home Screen)

Figure 6:
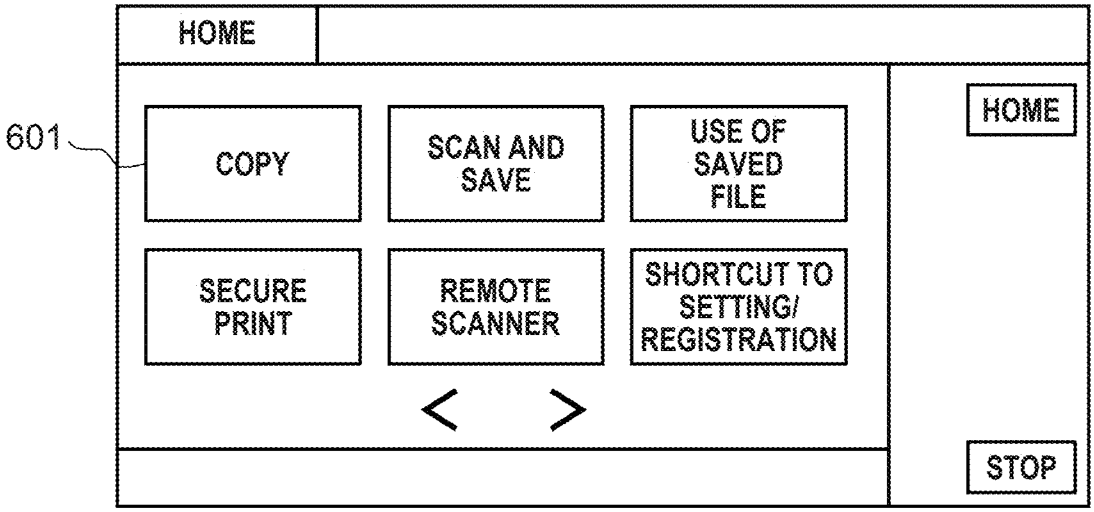
FIG. 6 illustrates an example of a function list screen of the image forming apparatus.

FIG. 6 illustrates an example of a home screen on which a list of functions is displayed. The home screen in FIG. 6 is displayed on the display 213 of the printing device 104 when the printing device 104 is started.

Buttons corresponding to a plurality of functions of the image forming apparatus 101 are displayed. Six buttons are displayed in the display area of the function buttons. Pressing the arrow keys at the bottom allows hidden buttons to be displayed through horizontal scrolling. A [Copy] button 601 is a button for displaying a setting screen for the copy function.

(Copy Function Screen)

Figure 7:
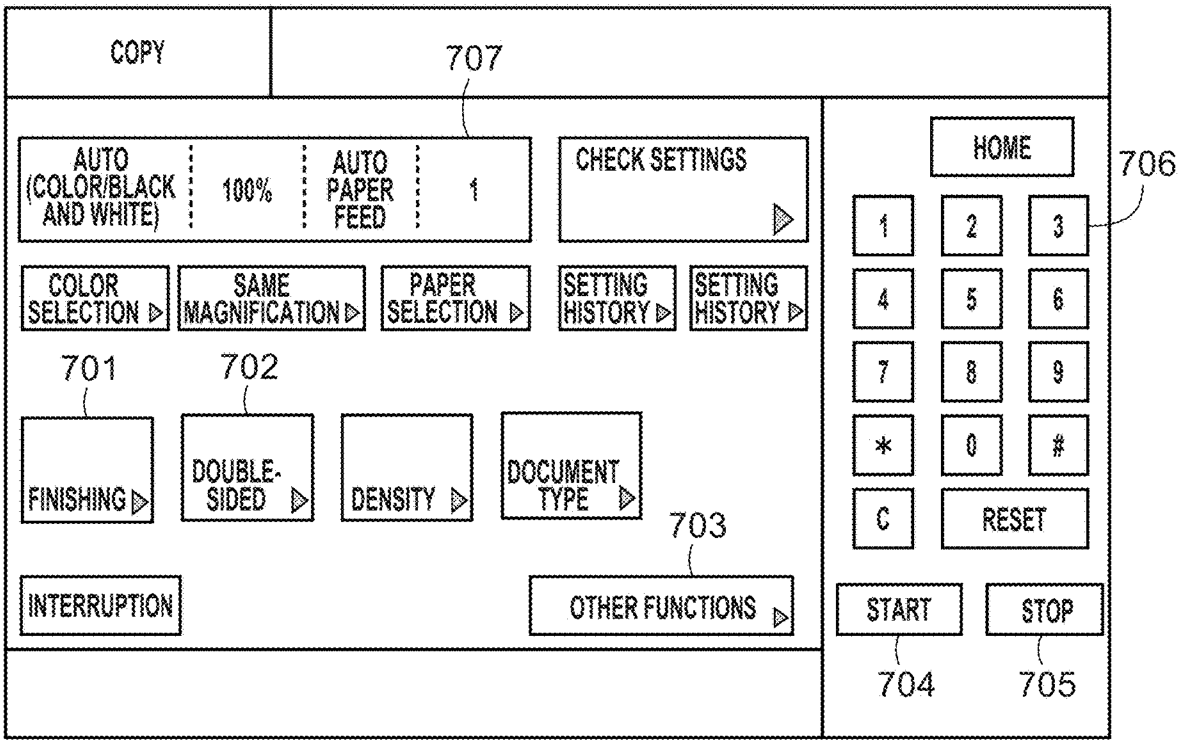
FIG. 7 illustrates an example of a copy function screen.

FIG. 7 illustrates an example of a copy function screen. The screen in FIG. 7 is displayed when the [Copy] button 601 in FIG. 6 is pressed. When a [Finishing] button 701 is pressed, a screen for setting finishing and paper sheet ejection, such as shift sorting and staple sorting, is displayed. When a [Double-sided] button 702 is pressed, a screen for setting the print mode, such as double-sided or single-sided printing, is displayed. When an [Other functions] button 703 is pressed, a screen for setting various other application modes is displayed. A [Start] button 704 is used for starting a job, such as starting a copy job. A [Stop] button 705 is used for stopping a job under execution.

Buttons 706 are used for accepting inputs of numerical values, such as the number of copies.

An area 707 indicates the number of copies to be printed. The number of copies can be set using the buttons 706.

(Selection Screen of Paper Sheet Ejection Destination)

Figure 8:
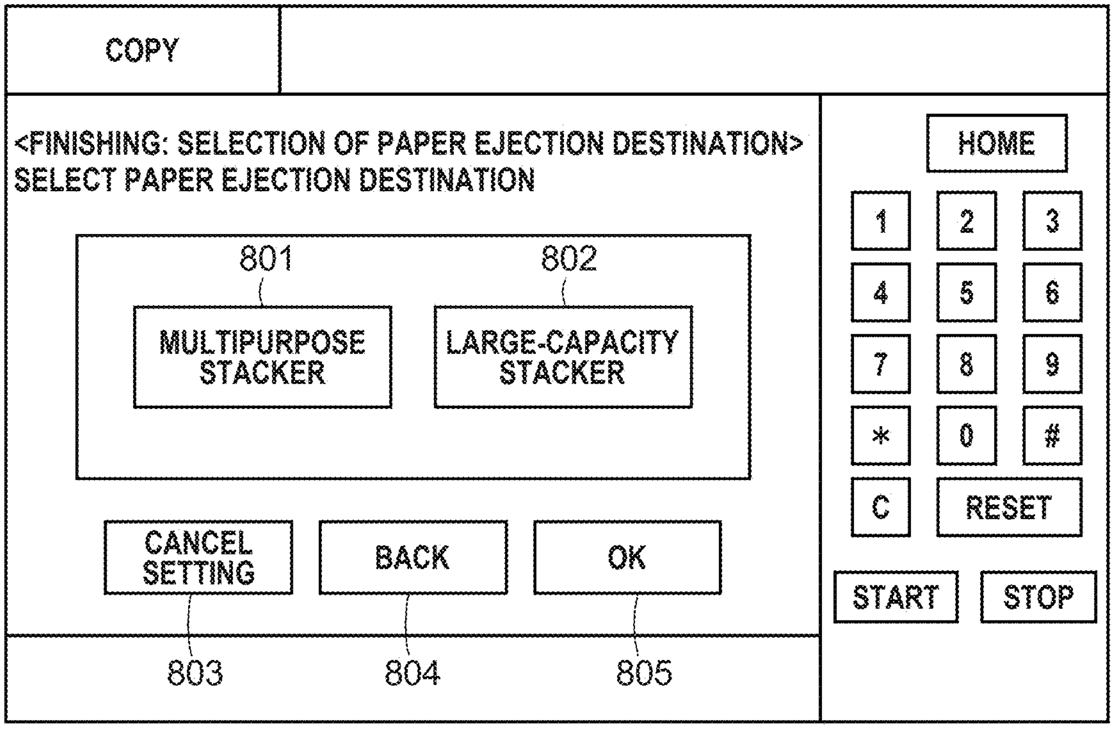
FIG. 8 illustrates an example of a setting screen for setting a paper sheet ejection destination.

FIG. 8 illustrates an example of a screen for selecting a paper sheet ejection destination. The screen in FIG. 8 is displayed when the [Finishing] button 701 in FIG. 7 is pressed. When a [Multipurpose stacker] button 801 is pressed, the multipurpose stacker 107 is set as the ejection destination. When a [Large-capacity stacker] button 802 is pressed, the large-capacity stacker 106 is set as the ejection destination. When a [Cancel setting] button 803 is pressed, the selection of the [Multipurpose stacker] button 801 or [Large-capacity stacker] button 802 are cleared. When a [Back] button 804 is pressed, the screen returns to the copy function screen in FIG. 7. When an [OK] button 805 is pressed, the selection of the [Multipurpose stacker] button 801 or [Large-capacity stacker] button 802 is confirmed.

(Selection Screen for Other Features)

FIG. 9A-A illustrates an example of a screen displaying a list of various functions in the application mode. The screen in FIG. 9A-A is displayed when the [Other functions] button 703 is pressed. Pressing a [Static elimination] button 901 displays a screen for setting the static elimination device 105. When a [Close] button 902 is pressed, the screen returns to the copy function screen of FIG. 7.

(Static Elimination Setting Screen)

Figure 9B:
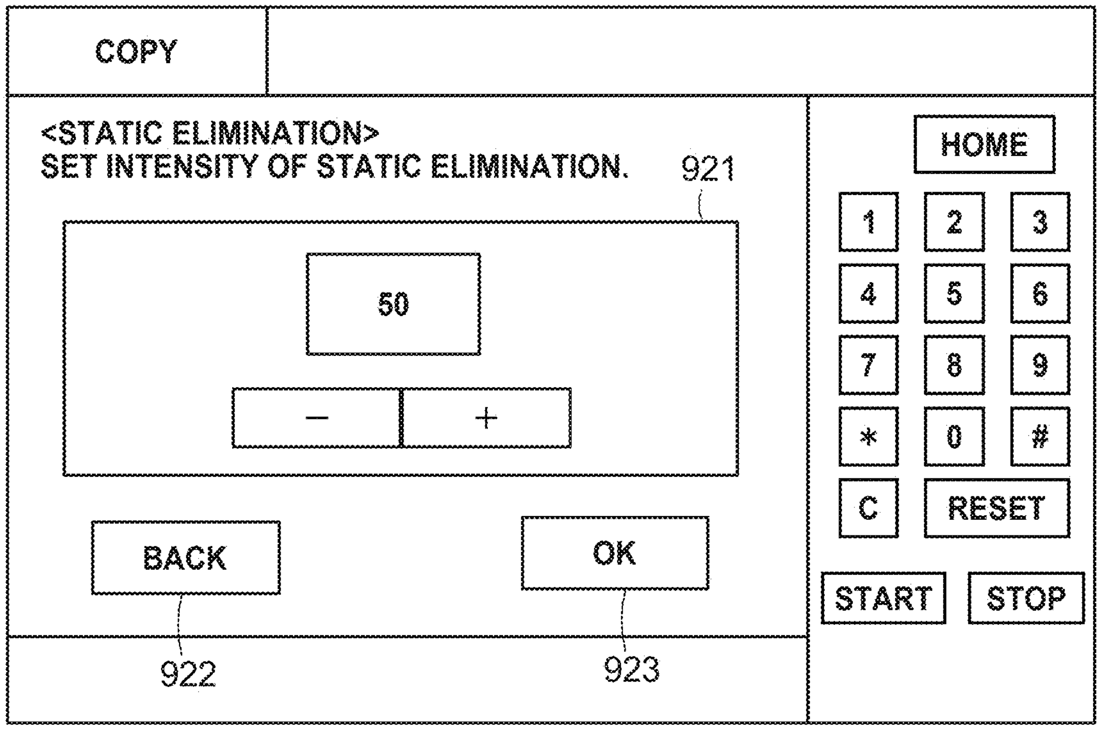

FIG. 9A-B illustrates an example of a setting screen for setting whether to perform a static elimination process by the static elimination device 105. The screen in FIG. 9A-B is displayed when the [Static elimination] button 901 in FIG. 9A-A is pressed. When the [Static elimination] button 911 is pressed, the setting of executing a static elimination process by the static elimination device 105 is made. When a [No static elimination] button 912 is pressed, the setting of not executing a static elimination process by the static elimination device 105 is made. When a [Cancel setting] button 913 is pressed, the selection of the [Static elimination] button 911 or the [No static elimination] button 912 is cleared. When a [Back] button 914 is pressed, the screen returns to the screen in FIG. 9A-A in which the list of the various functions in the application mode is displayed. When an [OK] button 915 is pressed, the selection of the [Static elimination] button 911 or the [No static elimination] button 912 is confirmed.

(Static Elimination Intensity Setting Screen)

FIG. 9B illustrates an example of a screen for setting the intensity of the static elimination control. The screen in FIG. 9B is displayed when the [Static elimination] button 911 in FIG. 9B is pressed, the [OK] button 915 is pressed, and then the setting for performing the static elimination by the static elimination device 105 is confirmed.

An area 921 is a setting area for setting the intensity of the static elimination control of the static elimination device 105. The intensity of static elimination can be increased or decreased with a "+" or "−" button. When a [Back] button 922 is pressed, the screen returns to the screen in FIG. 9A-B for setting whether to perform a static elimination. When an [OK] button 923 is pressed, the intensity of the static elimination control set in the area 921 is confirmed.

(Finisher Setting Screen)

Figure 10:
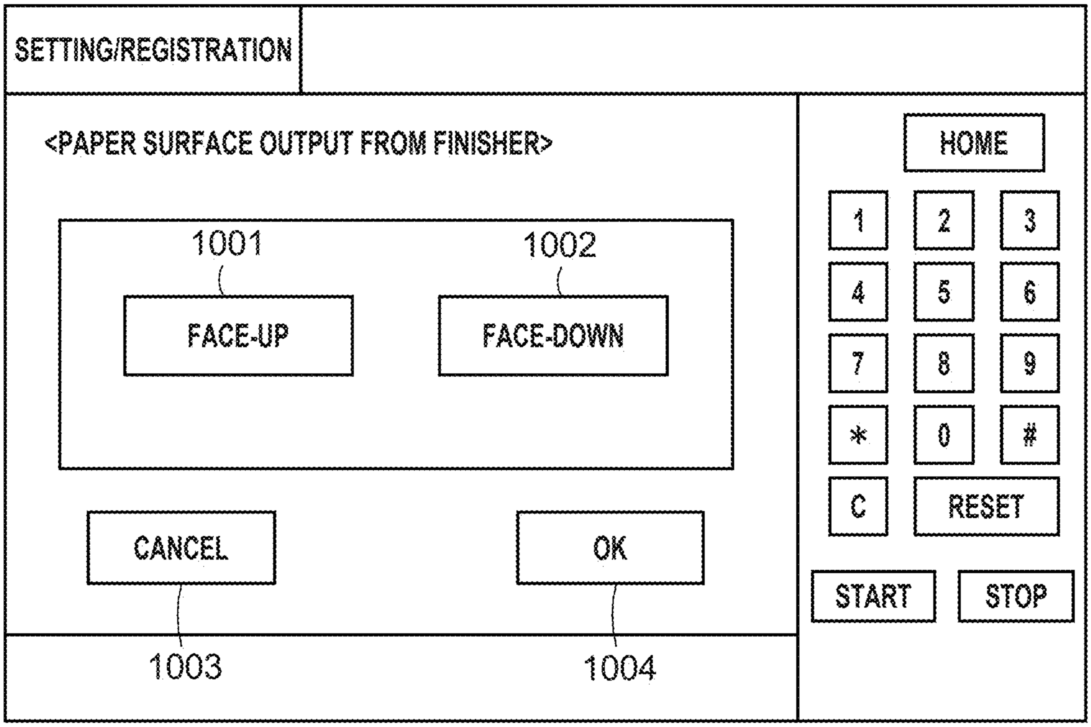
FIG. 10 is a diagram illustrating an example of a setting screen for setting a finisher configuration at the time of paper sheet ejection.

FIG. 10 is an example of a setting screen displayed in setting the ejection side of a paper sheet in the finisher configuration setting unit 302. As illustrated in FIG. 10, the user can set the face orientation of a paper sheet when the paper sheet is stacked on the multipurpose stacker 107 by using a [Face-up] button 1001 and a [Face-down] button 1002. When the [Face-up] button 1001 is pressed, the paper sheet is set to be stacked face-up in the multipurpose stacker 107. When the [Face-down] button 1002 is pressed, the paper sheet is set to be stacked face-down in the multipurpose stacker 107. When either the [Face-up] button 1001 or [Face-down] button 1002 is pressed and then the [OK] button 1004 is pressed, the setting of the finisher configuration is ended. When a [Cancel] button 1003 is pressed, the setting of the [Face-up] button 1001 or [Face-down] button 1002 is cleared.

In the present exemplary embodiment, the multipurpose stacker 107 is assumed to have paper sheets stacked face-down. Accordingly, when the button 1002 is pressed and then the button 1004 is pressed, the multipurpose stacker 107 is set to have a paper sheet stacked face-down.

(Processing of Reversal/Static Elimination Determination Unit)

Figure 11:
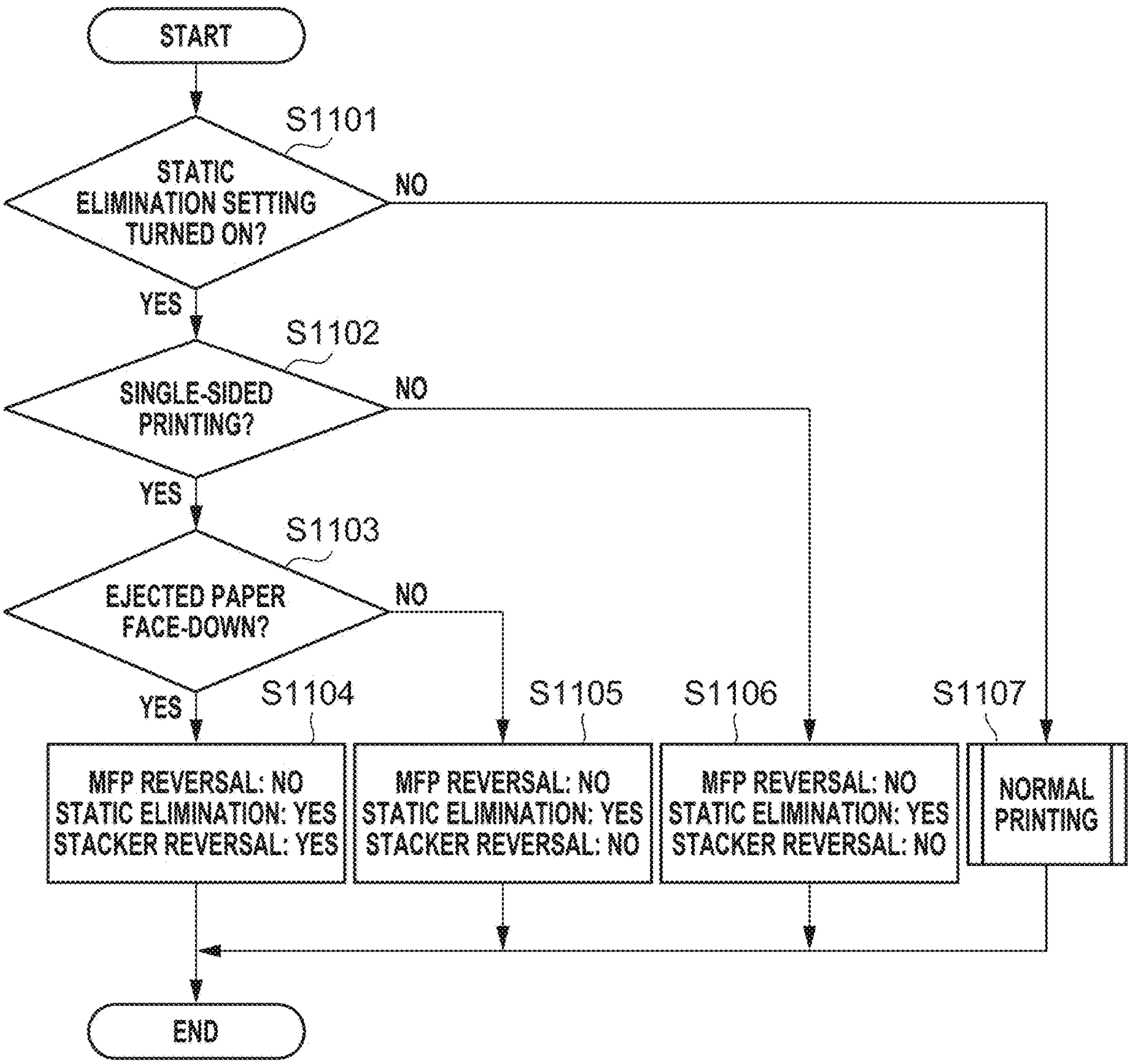
FIG. 11 is a flowchart of a process for determining a static elimination setting and a reversal control of a reversal mechanism.

FIG. 11 is a flowchart of a process by the reversal/static elimination determination unit 303 to determine whether to reverse a paper sheet in the printing device 104, whether to perform a static elimination process in the static elimination device 105, and whether to reverse the paper sheet in the large-capacity stacker 106. The process in the flowchart is performed by the CPU 209 of the printing device 104 loading programs stored in the HDD into the memory 120 and executing the programs. This process is started when a print job is input to the image processing apparatus. In the present exemplary embodiment, the devices that can reverse the paper sheet are the printing device 104 provided with the paper sheet reversal path 416 and the large-capacity stacker 106 provided with the paper sheet reversal path 426.

In step S1101, the reversal/static elimination determination unit 303 determines whether the setting of executing a static elimination process by the static elimination device 105 is made. This determination is made based on the input(s) accepted on the static elimination setting screen in FIG. 9A-B. If it is determined that the setting of executing the static elimination process is specified (YES in step S1101), the process proceeds to step S1102. If it is determined that the setting of executing the static elimination process is not specified (NO in step S1101), the process proceeds to step S1107.

In step S1102, the reversal/static elimination determination unit 303 determines whether a single-sided printing is specified. This determination is made based on the input(s) accepted on the setting screen illustrated in FIG. 7. If it is determined that a single-sided printing is specified (YES in step S1102), the process proceeds to step S1103.

If it is determined that a single-sided printing is not specified but a double-sided printing is specified (NO in step S1102), the process proceeds to step S1106.

In step S1103, the reversal/static elimination determination unit 303 determines whether the paper sheet is to be ejected face-down. This determination is made based on the input(s) accepted on the ejection destination setting screen in FIG. 8 and the finisher configuration setting screen in FIG. 10. The reversal/static elimination determination unit 303 acquires the ejection destination from the input(s) accepted on the ejection destination setting screen in FIG. 8, and further acquires the setting on the ejection side of the paper sheet from the finisher made by the finisher configuration setting unit 302. If it is determined that the paper sheet is to be ejected face-down (YES in step S1103), the process proceeds to step S1104. If it is determined that the paper sheet is not to be ejected face-down but to be ejected face-up (NO in step S1103), the process proceeds to step S1105.

(Static Elimination on, Single-Sided, and Face-Down)

Step S1104 indicates the result of determination by the reversal/static elimination determination unit 303 as to whether to reverse the paper sheet in the printing device 104, whether to perform a static elimination process by the static elimination device 105, and whether to reverse the paper sheet in the large-capacity stacker 106.

Since the setting of executing the static elimination process is made, the paper sheet is to be conveyed face-up to the static elimination device 105. Thus, the reversal/static elimination determination unit 303 determines that the paper sheet is to be ejected face-down, but the paper sheet is not to be reversed in the paper sheet reversal path 416 of the printing device 104. Since the setting of executing the static elimination process by the static elimination device 105 is made, the reversal/static elimination determination unit 303 determines that the static elimination process is to be performed. Furthermore, in order to orient the paper sheet face-down after the static elimination process by the static elimination device 105, the paper sheet is to be reversed after the static elimination process. Thus, the reversal/static elimination determination unit 303 determines that the paper sheet is to be reversed in the paper sheet reversal path 426 of the large-capacity stacker 106. After making the determination, the process is ended.

(Static Elimination on, Single-Sided, and Face-Up)

Step S1105 indicates the result of determination by the reversal/static elimination determination unit 303 as to whether to reverse the paper sheet in the printing device 104, whether to perform a static elimination process by the static elimination device 105, and whether to reverse the paper sheet in the large-capacity stacker 106.

Since the setting of executing the static elimination process is made, the paper sheet is to be conveyed face-up to the static elimination device 105. Also, since the setting of ejecting the paper sheet face-up is specified, the paper sheet is not to be reversed in the paper sheet reversal path 416 of the printing device 104. Thus, the reversal/static elimination determination unit 303 determines that the paper sheet is not to be reversed in the paper sheet reversal path 416 of the printing device 104. Since the setting of executing the static elimination process by the static elimination device 105 is made, the reversal/static elimination determination unit 303 determines that the static elimination process is to be performed in the static elimination device 105. After passing through the static elimination device 105, the paper sheet is placed face-up as specified, so there is no need to reverse the paper sheet. Then, the reversal/static elimination determination unit 303 determines that the paper sheet is not to be reversed in the paper sheet reversal path 426 of the large-capacity stacker 106. After making the determination, the process is ended.

(Double-Sided Printing)

Step S1106 indicates the result of determination by the reversal/static elimination determination unit 303 as to whether to reverse the paper sheet in the printing device 104, whether to perform a static elimination process in the static elimination device 105, and whether to reverse the paper sheet in the large-capacity stacker 106.

In double-sided printing, the CPU 209 of the printing device 104 controls the order of printing on the first and second sides of the paper sheet to meet the ejection side setting. Thus, the paper sheet with the set ejection side is conveyed to the static elimination device 105. At this time, the final printed side matches the printed side 505 in FIG. 5, so that the static elimination process can be performed normally. Thus, the reversal/static elimination determination unit 303 determines that the paper sheet is not to be reversed in the paper sheet reversal path 416 of the printing device 104. The reversal specified as unnecessary here refers to the reversal after the image formation of the second side, not the reversal in the paper sheet reversal path 416 in order to form an image on the second side after the image formation on the first side. Since the setting of executing the static elimination process by the static elimination device 105 is made, the reversal/static elimination determination unit 303 determines that the static elimination process is to be performed by the static elimination device 105. After passing through the static elimination device 105, the face orientation of the paper sheet is set under the control of the order of printing the first and second sides by the CPU 209 of the printing device 104, so that no reversal is necessary. Thus, the reversal/static elimination determination unit 303 determines that the paper sheet is not to be reversed in the paper sheet reversal path 426 of the large-capacity stacker 106. After making the determination, this process is ended.

(Normal Printing)

In step S1107, the reversal/static elimination determination unit 303 does not determine whether to perform reversal in the printing device 104 or the large-capacity stacker 106. In step S1107, a normal printing instruction is issued to the CPU 209. After the instruction is issued, this process is ended.

Based on the above-described result of determination by the reversal/static elimination determination unit 303, the print control unit 305 issues a paper sheet reversal instruction and a static elimination instruction to the corresponding devices and controls the print process.

Furthermore, before making the determination in step S1104, the reversal/static elimination determination unit 303 may determine whether the image forming apparatus 101 includes the large-capacity stacker 106. This determination is made based on the result of an inquiry made by the CPU 209 to the CPUs of the corresponding devices. If the image forming apparatus 101 includes the large-capacity stacker 106, the process proceeds to step S1104. If the image forming apparatus 101 does not include the large-capacity stacker 106, the reversal/static elimination determination unit 303 determines that the paper sheet is to be reversed in the printing device 104 and the static elimination is not to be performed by the static elimination device 105.

Before making the determination in step S1105 or step S1106, the reversal/static elimination determination unit 303 may determine whether the image forming apparatus 101 includes the large-capacity stacker 106. If the image forming apparatus 101 does not include the large-capacity stacker 106, the reversal/static elimination determination unit 303 does not determine whether to reverse the paper sheet in the large-capacity stacker 106.

As described above, taking into consideration a device including a reversal mechanism that reverses a paper sheet with a set ejection side, a static elimination process can be performed by the static elimination device 105 with any combination of a single-sided/double-sided printing and ejection side, including face-down ejection.

(Example of Paper Sheet Conveyance)

Figure 12:
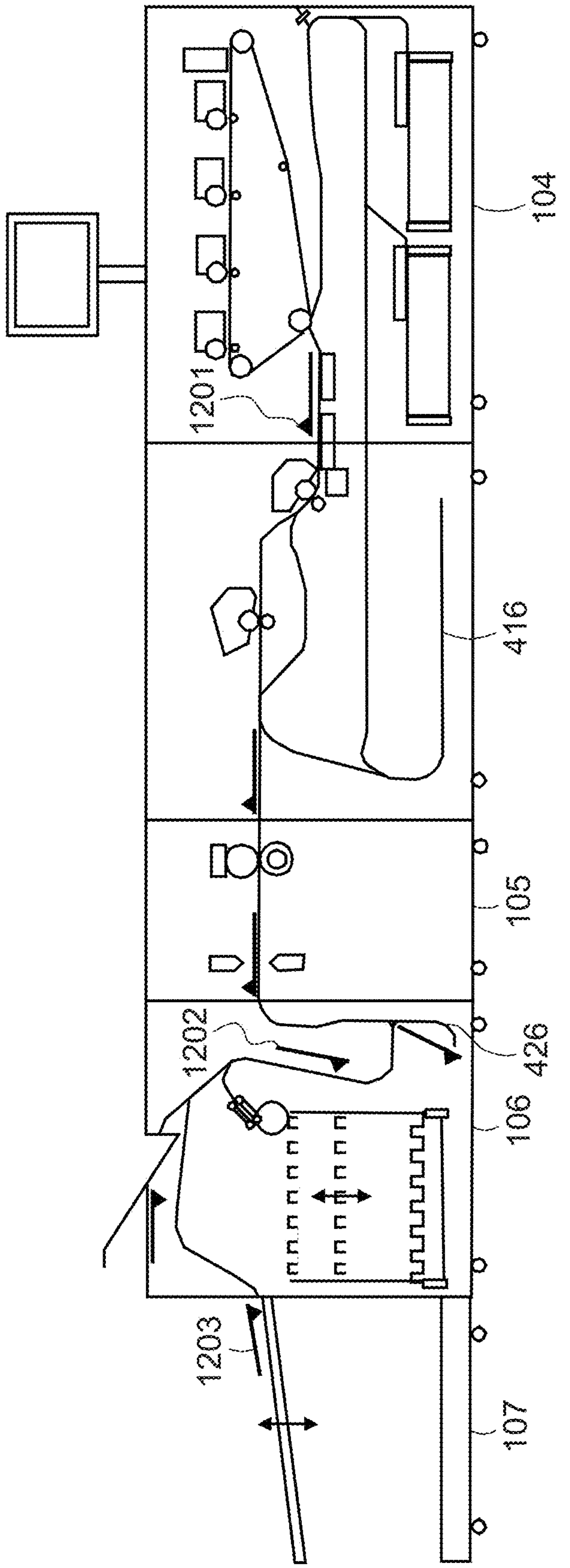
FIG. 12 is a diagram illustrating an example of paper sheet conveyance.

A specific example of the face orientation of a paper sheet and a conveyance path will be exemplified. FIG. 12 illustrates the face orientation of the printed side of a paper sheet and the conveyance path that are implemented based on the result of the determination in step S1104 by the reversal/static elimination determination unit 303. The black triangles indicate the printed side.

When the setting of ejecting a paper sheet 1201 face-down is specified, the paper sheet 1201 is usually reversed in the paper sheet reversal path 416. However, the paper sheet 1201 is not reversed in the paper sheet reversal path 416 of the printing device 104 due to the determination by the reversal/static elimination determination unit 303. The paper sheet 1201 with an image formed thereon is conveyed to the static elimination device 105 with the paper sheet 1201 facing upward. The paper sheet through the static elimination process by the static elimination device 105 is reversed in the reversal path 426 of the large-capacity stacker 106 and turned face-down as a paper sheet 1202 indicated in FIG. 12. The paper sheet 1202 facing downward is conveyed to the multipurpose stacker 107 and is ejected as a paper sheet 1203 indicated in FIG. 12.

A second exemplary embodiment will be described. In the first exemplary embodiment, the image forming apparatus 101 is assumed to include a device having a reversal mechanism, and it is determined whether to reverse a paper sheet in the image forming apparatus 101 and whether to perform a static elimination so as to eject the paper sheet with the ejection side set by the user and perform a static elimination by the static elimination device 105.

In the second exemplary embodiment, an image forming apparatus 101 is assumed to include no stacker device with a reversal mechanism, and it is determined whether to reverse a paper sheet in the stacker device of the image forming apparatus 101 and whether to perform a static elimination, with priority given to ejecting the paper sheet with the ejection side set by the user.

(Structure of Image Forming Apparatus)

Figure 13:
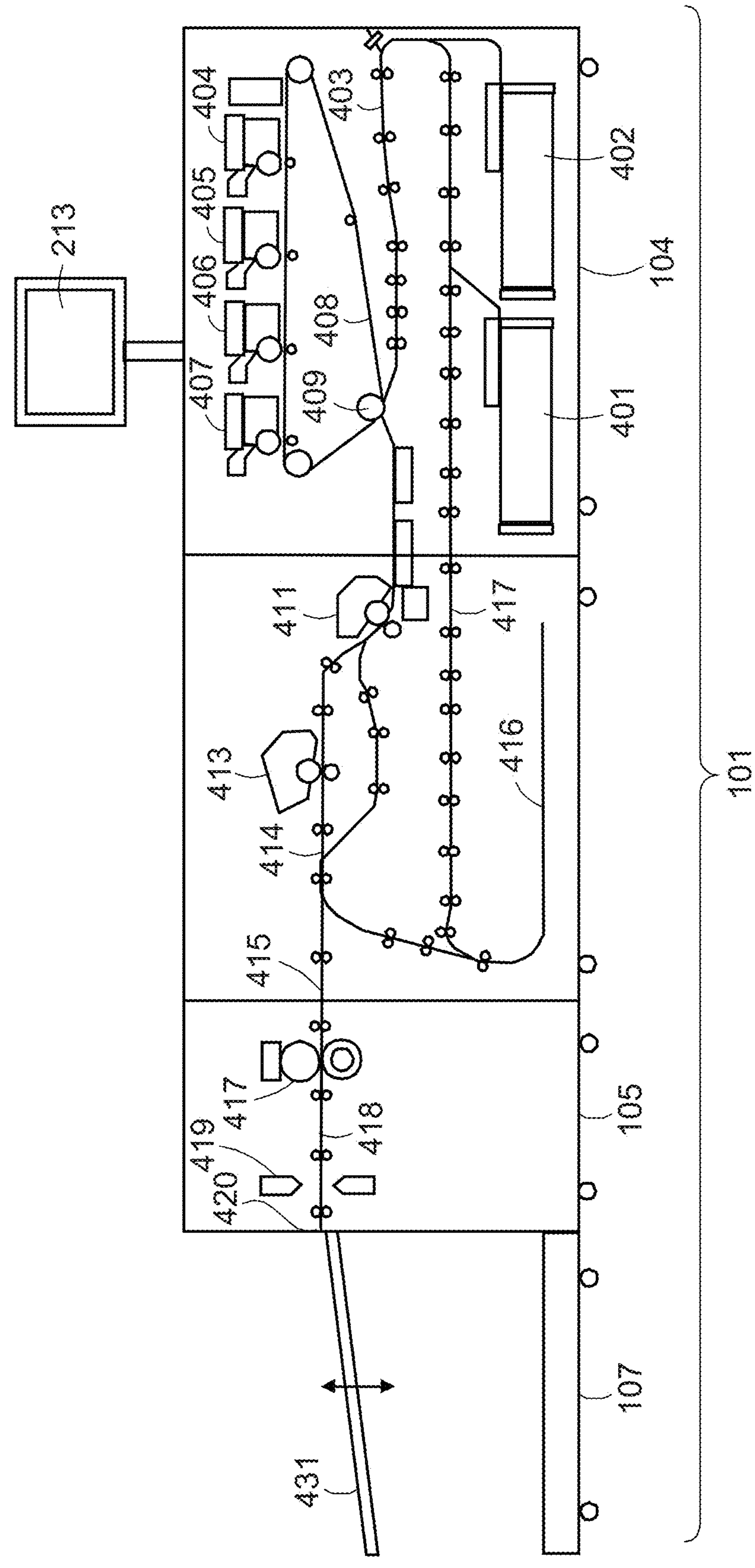
FIG. 13 is a schematic cross-sectional view of the structure of an image forming apparatus according to another exemplary embodiment.

FIG. 13 is a structural cross-sectional view of the image forming apparatus 101 according to the second exemplary embodiment. Description of the same parts as those illustrated in FIG. 4 will be omitted.

The paper sheet through a static elimination device 105 and conveyed to a paper sheet conveyance path 420 is ejected onto a stacking table 431 of a multipurpose stacker 107.

Figure 14:
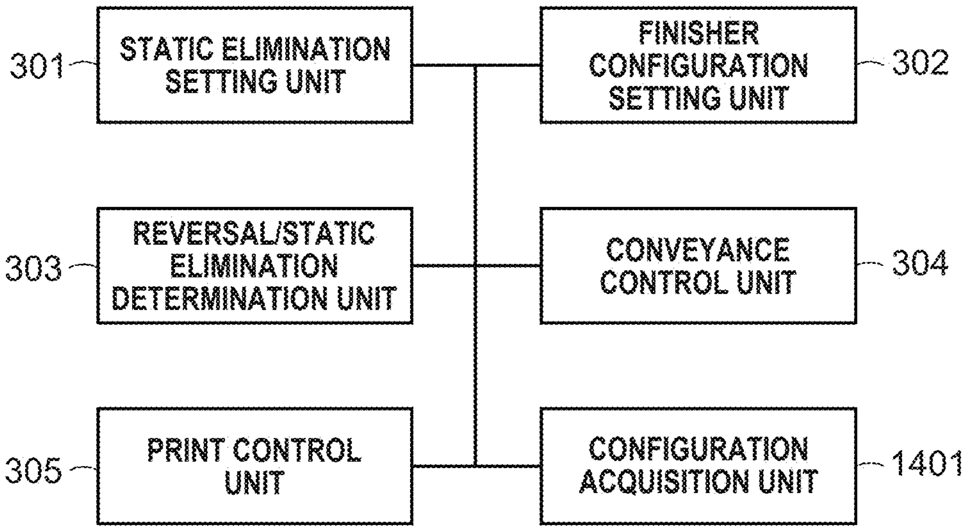
FIG. 14 is a block diagram illustrating the configuration of a control system of the image forming apparatus according to the other exemplary embodiment.

FIG. 14 is a block diagram illustrating the configuration of the CPU 209 of the printing device 104 according to the second exemplary embodiment. Description of the same parts as those illustrated in FIG. 3 will be omitted.

A configuration acquisition unit 1401 acquires information about a configuration, such as whether a device in the image forming apparatus 101 that is communicable via the communication cable 232 includes a reversal mechanism. The configuration acquisition unit 1401 acquires the information from the CPU of each device, such as the CPU 221.

(Processing of Reversal/Static Elimination Determination Section)

Figure 15:
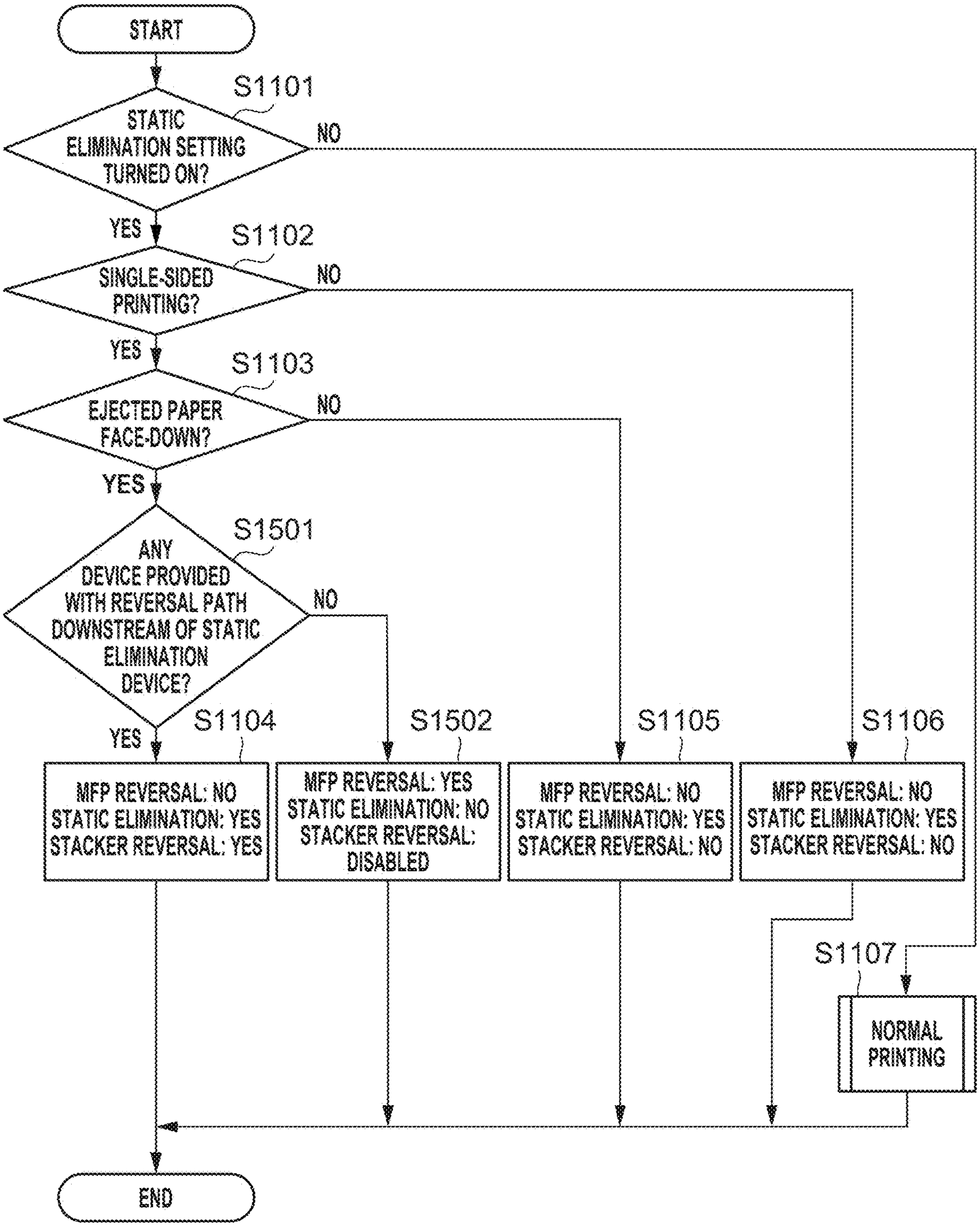
FIG. 15 is a flowchart of a process for determining a static elimination setting and a reversal control of a reversal mechanism according to the other exemplary embodiment.

FIG. 15 is a flowchart illuminating a procedure of determinations by a reversal/static elimination determination unit 303 as to whether to reverse a paper sheet in the printing device 104, whether to perform a static elimination process in the static elimination device 105, and whether to reverse the paper sheet in a large-capacity stacker 106. Descriptions of steps given the same step numbers as those in FIG. 11 will be omitted.

If it is determined in step S1103 that the paper sheet is to be ejected not face-up but face-down, the process proceeds to step S1501.

In step S1501, the reversal/static elimination determination unit 303 determines whether there is a device provided with a reversal mechanism (for example, a stacker device) downstream of the static elimination device 105. This determination is made based on the device information acquired by the configuration acquisition unit 1401. If there is a device provided with a reversal path downstream of the static elimination device 105 (YES in step S1501), the process proceeds to step S1104, and if there is no device provided with a reversal path downstream of the static elimination device 105 (NO in step S1501), the process proceeds to step S1502.

Step S1502 indicates the result of determination by the reversal/static elimination determination unit 303 as to whether to reverse a paper sheet in the printing device 104, whether to perform a static elimination process in the static elimination device 105, and whether to reverse the paper sheet in the large-capacity stacker 106.

Since the setting of executing the static elimination process is made, the paper sheet is to be conveyed face-up to the static elimination device 105. However, there is no device including a reversal path downstream of the static elimination device 105. In addition, since there is no device including a reversal mechanism downstream of the static elimination device 105, the paper sheet cannot be reversed after the static elimination process is performed in the static elimination device 105. Thus, in order to prioritize the ejection side of the paper sheet set by the user, the paper sheet is turned face-down in the printing device 104. Thus, the reversal/static elimination determination unit 303 determines that the paper sheet is to be reversed in the paper sheet reversal path 416 of the printing device 104. Although the setting of executing the static elimination process in the static elimination device 105 is made, the static elimination process performed on the paper sheet facing downward can deteriorate the charged state of the paper sheet. Thus, the reversal/static elimination determination unit 303 determines that the static elimination process in the static elimination device 105 is not to be performed. Finally, since the large-capacity stacker 106 is not included in the image forming apparatus 101, the reversal/static elimination determination unit 303 does not determine whether to reverse the paper sheet in the large-capacity stacker 106. After making the determination, this process is ended.

As described above, in the second exemplary embodiment, the printing device 104 does not include a reversal mechanism, and priority is given to the ejection of the paper sheet with the ejection side set by the user. Even if the setting of executing the static elimination process is made, the printing device 104 is controlled not to perform the static elimination process to prevent deterioration of the charged state of the paper sheet.

Figure 16:
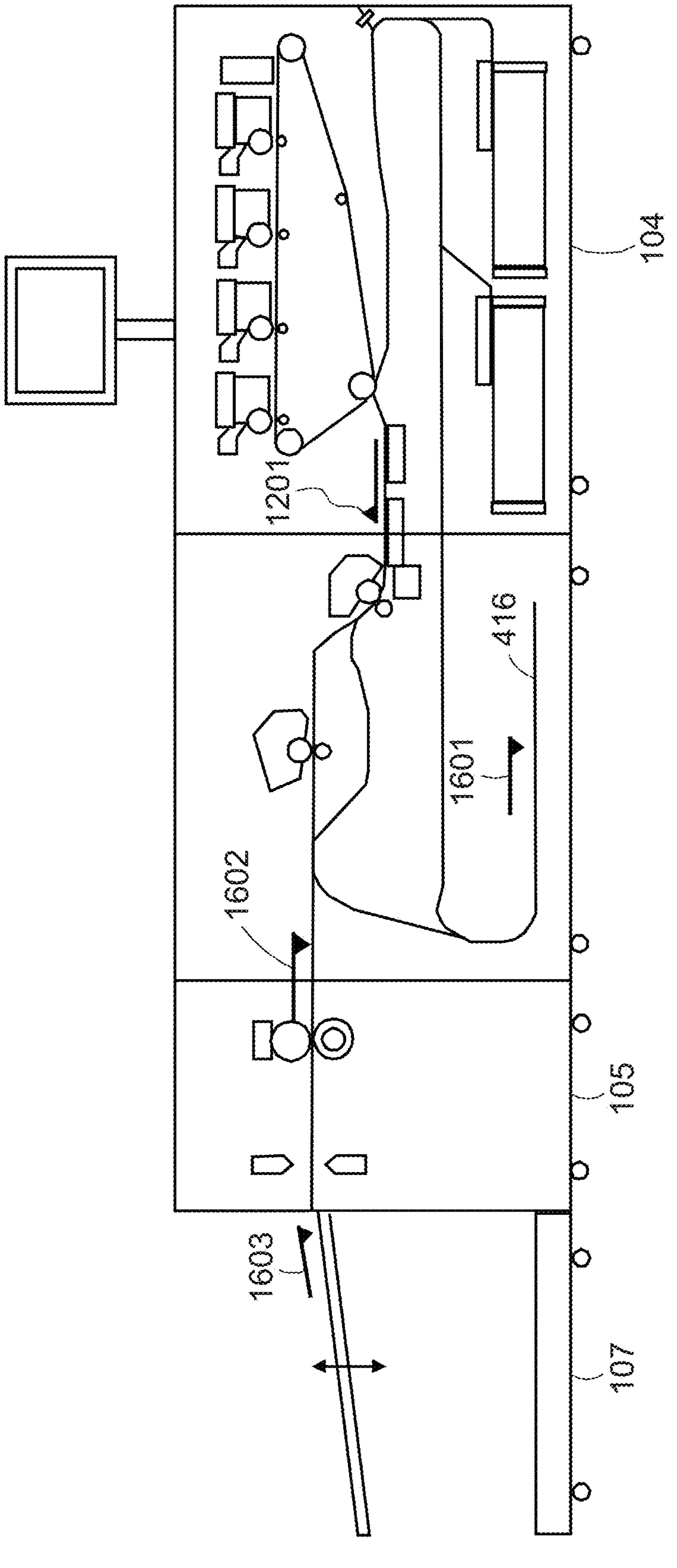
FIG. 16 is a diagram illustrating an example of paper sheet conveyance according to the other exemplary embodiment.

A specific example of face orientation and conveyance of a paper sheet will be described. FIG. 16 illustrates the face orientation of the printed side of a paper sheet and the conveyance path implemented based on the result of determination by the reversal/static elimination determination unit 303 in step S1502.

When the setting of ejecting the paper sheet facing downward, the paper sheet is reversed in the paper sheet reversal path 416.

Thus, a paper sheet 1601 is reversed in the sheet reversal path 416 and is conveyed face-down to the static elimination device 105 as a paper sheet 1602 indicated in FIG. 16. The paper sheet conveyed to the static elimination device 105 passes through the static elimination device 105 not being subjected to the static elimination process, and is conveyed face-down to the multipurpose stacker 107 as a paper sheet 1603 indicated in FIG. 16, and is ejected.

A third exemplary embodiment will be described. In the second exemplary embodiment, if the condition of the ejection side and a static elimination process set by the user cannot be met at a time, with the priority given to the ejection of the paper sheet with the ejection side set by the user, it is determined that the static elimination process is not to be performed. Based on this determination, the print control unit 305 performs a printing process with a specified number of copies (a plurality of copies) of a print job of which an execution instruction is issued. At this time, the printed paper sheet is assumed to be in a charged state as no static elimination process is performed.

In the third exemplary embodiment, with the priority given to the ejection of a paper sheet with its ejection side set by the user, in the printing process with the determination that the static elimination process is not to be performed (step S1502), the printing process is stopped once after the printing of the first copy. Then, a screen is displayed to ask the user whether to continue printing, so that the user's intention as to whether to continue printing is confirmed.

(Print Continuation Confirmation Screen)

Figure 17:
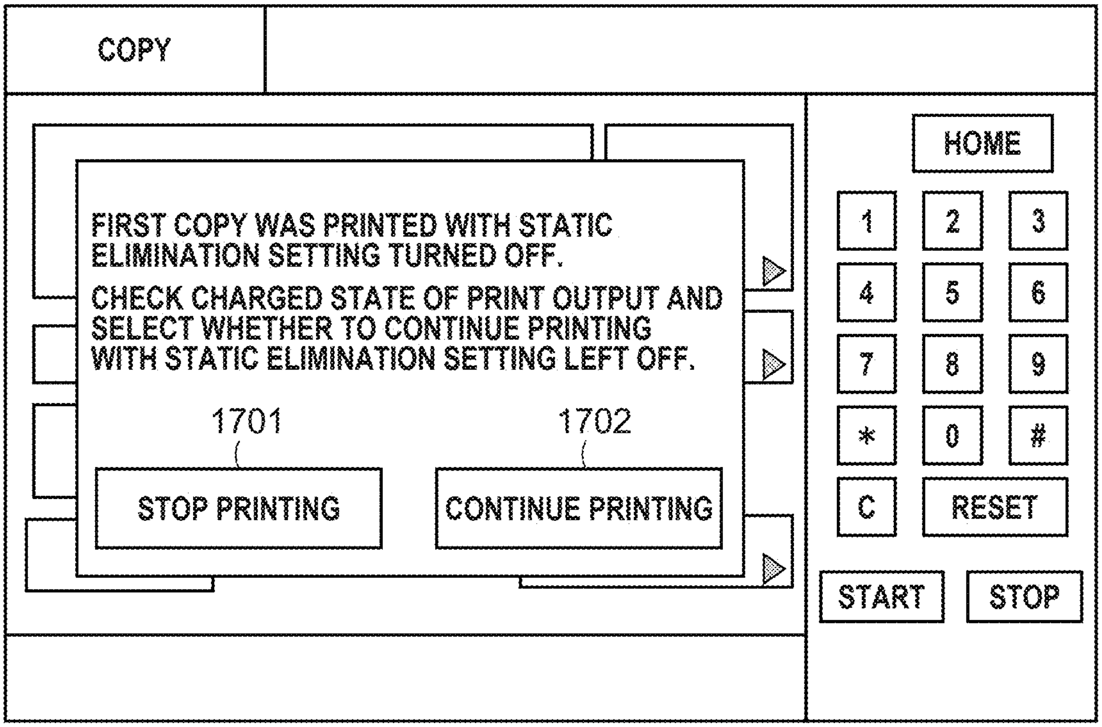
FIG. 17 is an example of a print continuation confirmation screen according to the other exemplary embodiment.

FIG. 17 is an example of a screen that prompts the user to check the charged state of a printed material produced with the setting of a static elimination turned off and to select whether to continue printing. The screen in FIG. 17 is displayed when the reversal/static elimination determination unit 303 makes the determination in step S1502, then the print control unit 305 prints the first copy based on the determination result, and then the printed material is ejected. When a [Stop printing] button 1701 is pressed, the job is set to be cleared. When a [Continue printing] button 1702 is pressed, the job is set to be continued.

(Print Control Process)

Figure 18:
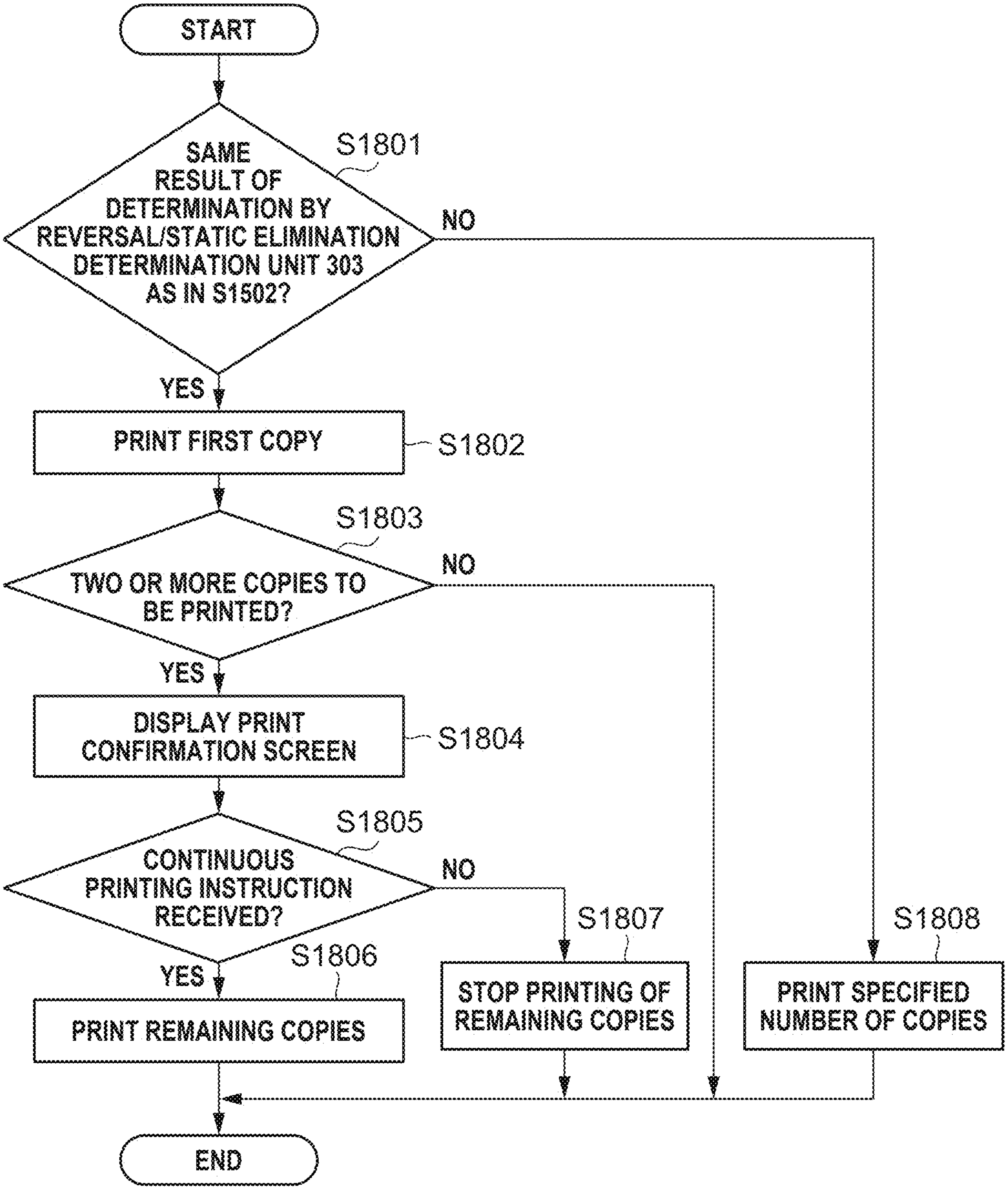
FIG. 18 is a flowchart of a process for controlling a print process according to the other exemplary embodiment.

FIG. 18 is a flowchart of a process of controlling printing performed by the print control unit 305 when the result of determination by the reversal/static elimination determination unit 303 is the same as that in step S1502. The process in this flowchart is executed by the print control unit 305 when the determination by the reversal/static elimination determination unit 303 illustrated in FIG. 15 is ended.

In step S1801, the print control unit 305 determines whether the result of determination by the reversal/static elimination determination unit 303 is the same as that in step S1502. If the determination result is the same as that in step S1502 (YES in step S1801), the process proceeds to step S1802. If the determination result is other than that in step S1502 (NO in step S1801), the process proceeds to step S1808.

In step S1802, the print control unit 305 instructs the CPU 209 of the printing device 104 to print the first copy. After issuing the instruction, the process proceeds to step S1803.

In step S1803, the print control unit 305 determines whether the number of copies to be printed in the job of which the execution instruction is issued is two or more. This determination is made based on the input accepted on the copy function screen in FIG. 7. If the number of copies set in the area 707 in FIG. 7 is two or more (YES in step S1803), the process proceeds to step S1804. If the number of copies is one (NO in step S1803), this process is ended.

In step S1804, the print control unit 305 instructs the CPU 209 to display the print continuation confirmation screen in FIG. 17 on the display 213 of the printing device 104. When the screen is displayed, the process proceeds to step S1805.

In step S1805, the print control unit 305 determines whether an instruction for continuing printing is received. This determination is made based on the input accepted on the print continuation confirmation screen illustrated in FIG. 17. If the user presses the [Continue Printing] button 1702, the process proceeds to step S1806. If the user presses the [Cancel Printing] button 1701, the process proceeds to step S1807.

In step S1806, the print control unit 305 instructs the CPU 209 of the printing device 104 to print the remaining number of copies. After issuing the instruction, this process is ended.

In step S1807, the print control unit 305 instructs the CPU 209 of the printing device 104 to stop the printing. After issuing the instruction, this process is ended.

In step S1808, the print control unit 305 instructs the CPU 209 of the printing device 104 to print a specified number of copies. After issuing the instruction, this process is ended.

As described above, in the third exemplary embodiment, when no static elimination process is performed with the priority placed on the ejection side, the printing process is stopped once after the first copy is printed. Then, the user is prompted to check the charged state of the output and set whether to print the remaining copies. This allows the user to grasp the charged state before printing.

OTHER EMBODIMENTS

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-180715, which was filed on Oct. 20, 2023 and which is hereby incorporated by reference herein in its entirety.

What is claimed is:

1. A printing system comprising:

a printing apparatus that prints an image on a first side of a sheet conveyed;

a static elimination apparatus that performs a static elimination process on the first side of the sheet on which the image has been printed by the printing apparatus; and a controller that, in a case where a face-up ejection of the sheet to eject with the first side facing upward is specified, performs control to not reverse the sheet on which the static elimination process has been performed by the static elimination apparatus, and performs control to eject the sheet, and in a case where a face-down ejection of the sheet to eject with the first side facing downward is specified, performs control to reverse, with a reversal path, the sheet on which the static elimination process has been performed by the static elimination apparatus, the reversal path reversing the sheet on which the static elimination process has been performed by the static elimination apparatus, and performs control to eject the sheet reversed by the reversal path.

2. The printing system according to claim 1, wherein, in a case where a single-sided printing is set and the face-up ejection is specified, the controller performs control to not reverse the sheet on which the static elimination process has been performed by the static elimination apparatus, and in a case where the single-sided printing is set and the face-down ejection to eject with the first side facing downward is specified, the controller controls the reversal path to reverse the sheet on which the static elimination process has been performed by the static elimination apparatus.

3. The printing system according to claim 1, wherein in a case where a double-sided printing is set, the printing apparatus prints an image on the first side and a second side different from the first side of the sheet, the static elimination apparatus further performs the static elimination process on the second side, and the controller performs control to eject the sheet subjected to the static elimination process.

4. The printing system according to claim 1, wherein the printing apparatus further includes another reversal path configured to reverse the sheet.

5. The printing system according to claim 4, wherein the controller is further configured to determine whether the reversal path is present downstream of the static elimination apparatus, wherein in a case where the controller determines that the reversal path is not present downstream of the static elimination apparatus, the controller controls the other reversal path to reverse the sheet on which the image has been printed by the printing apparatus.

6. The printing system according to claim 5, wherein when the controller determines that the reversal path is not present downstream of the static elimination apparatus, the other reversal path reverses the sheet on which the image has been printed by the printing apparatus, and the static elimination apparatus does not perform the static elimination process on the sheet reversed in the printing apparatus.

7. The printing system according to claim 6, further comprising a display that performs, in a case of printing a plurality of copies, display to receive a user instruction as to whether to continue or stop a printing process after a first copy is printed.

8. A control method of a printing system, the control method comprising:

printing, by a printing apparatus, an image on a first side of a sheet conveyed;

performing a static elimination process on the first side of the sheet on which the image has been printed by the printing apparatus;

performing control to eject the sheet without net reversing the sheet subjected to the static elimination process in a case where a face-up ejection of the sheet to eject with the first side facing upward is specified; and reversing the sheet subjected to the static elimination process in a case where a face-down ejection of the sheet to eject with the first side facing downward is specified, and performing control to eject the sheet reversed in the reversing.

9. A computer-readable storage medium storing computer-executable instructions that, when executed by a computer, cause the computer to execute a control method of a printing system, the control method comprising:

printing, by a printing apparatus, an image on a first side of a sheet conveyed;

performing a static elimination process on the first side of the sheet on which the image has been printed by the printing apparatus;

performing control to eject the sheet without reversing the sheet subjected to the static elimination process in a case where a face-up ejection of the sheet to eject with the first side facing upward is specified; and reversing the sheet subjected to the static elimination process in a case where a face-down ejection of the sheet to eject with the first side facing down is specified, and performing control to eject the sheet reversed in the reversing.

* * * * *